United States Patent
Nam et al.

(10) Patent No.: US 9,240,581 B2
(45) Date of Patent: Jan. 19, 2016

(54) BATTERY UNIT AND BATTERY MODULE USING THE SAME

(71) Applicant: Samsung SDI Co., Ltd., Yongin-si, Gyeonggi-do (KR)

(72) Inventors: Jong-Woo Nam, Yongin-si (KR); Yong-Sam Kim, Yongin-si (KR); Jang-Hyun Song, Yongin-si (KR)

(73) Assignee: Samsung SDI Co., Ltd, Yongin-si (KR)

( * ) Notice: Subject to any disclaimer, the term of this patent is extended or adjusted under 35 U.S.C. 154(b) by 12 days.

(21) Appl. No.: 14/048,943

(22) Filed: Oct. 8, 2013

(65) Prior Publication Data
US 2014/0302379 A1   Oct. 9, 2014

(30) Foreign Application Priority Data

Apr. 8, 2013  (KR) ........................ 10-2013-0038282

(51) Int. Cl.
*H01M 2/24*  (2006.01)
*H01M 2/30*  (2006.01)
*H01M 2/20*  (2006.01)
*H01M 2/26*  (2006.01)
*H01M 2/22*  (2006.01)

(52) U.S. Cl.
CPC ................. *H01M 2/30* (2013.01); *H01M 2/202* (2013.01); *H01M 2/263* (2013.01); *H01M 2/20* (2013.01); *H01M 2/22* (2013.01)

(58) Field of Classification Search
CPC ............ H01M 2/20; H01M 2/22; H01M 2/30
See application file for complete search history.

(56) References Cited

U.S. PATENT DOCUMENTS

| 2010/0081048 A1 | 4/2010 | Nansaka et al. |
| 2010/0173190 A1 | 7/2010 | Tsuchiya |
| 2011/0045345 A1 | 2/2011 | Tsuchiya et al. |
| 2011/0070466 A1 | 3/2011 | Park et al. |

(Continued)

FOREIGN PATENT DOCUMENTS

| DE | 10 2010 062 183 A1 | 5/2012 |
| EP | 2 357 686 A1 | 8/2011 |

(Continued)

OTHER PUBLICATIONS

EPO Search Report dated Aug. 6, 2014, for European Patent application 13195605.4, (6 pages).

(Continued)

*Primary Examiner* — Jane Rhee
(74) *Attorney, Agent, or Firm* — Christie, Parker & Hale, LLP

(57) ABSTRACT

A battery unit includes a case accommodating an electrode assembly and having an opening, and a cap plate cover the opening, and having a terminal insertion portion. The battery unit further includes a terminal member inserted into the case through the terminal insertion portion from an exterior of the case and coupled to the electrode assembly, the terminal member having a terminal portion, extending in a major side direction of the cap plate at an exterior of the cap plate, and being separated from an upper surface of the cap plate. The battery unit further includes a fixing member in the terminal insertion portion fixing the terminal member to the cap plate and having injection-molded plastic resin in the terminal insertion portion surrounding the terminal member; and a support member coupled to the cap plate and supporting the terminal portion with respect to the cap plate.

16 Claims, 14 Drawing Sheets

(56) References Cited

U.S. PATENT DOCUMENTS

| | | | |
|---|---|---|---|
| 2011/0244309 A1* | 10/2011 | Byun et al. | 429/158 |
| 2011/0300414 A1 | 12/2011 | Baek | |
| 2012/0156536 A1 | 6/2012 | Yamazaki et al. | |
| 2012/0328932 A1 | 12/2012 | Guen et al. | |
| 2013/0078506 A1 | 3/2013 | Guen | |
| 2013/0323591 A1 | 12/2013 | Woehrle et al. | |

FOREIGN PATENT DOCUMENTS

| | | | |
|---|---|---|---|
| EP | 2 429 011 A1 | 3/2012 | |
| EP | 2 495 784 A2 | 9/2012 | |
| JP | 2005-339990 A | 12/2005 | |
| JP | 2006-216411 | 8/2006 | |
| JP | 2006-236790 A | 9/2006 | |
| JP | 2008-311014 A | 12/2008 | |
| JP | 2009-283256 A | 12/2009 | |
| JP | 2010-80355 A | 4/2010 | |
| JP | 2010-272324 | 12/2010 | |
| JP | 2010-282847 A | 12/2010 | |
| JP | 2011-23142 | 2/2011 | |
| WO | WO2012/169055 A1 | 12/2012 | |

OTHER PUBLICATIONS

EPO Search Report dated Aug. 21, 2014, for corresponding European Patent application 13195590.8, (8 pages).
Patent Abstracts of Japan, and English machine translation of Japanese Publication 2011-23142 dated Feb. 3, 2011, listed above, (31 pages).
EPO Search Report dated Nov. 3, 2014, corresponding to European Patent application 13195587.4, (12 pages).
EPO Search Report dated Jul. 2, 2014, for European Patent application 13195587.4, (7 pages).
Patent Abstracts of Japan, and English machine translation of Japanese Publication 2010-272324 dated Dec. 2, 2010, listed above, (15 pages).
English Machine Translation of Japanese Patent Publication No. 2005-339990 A, dated Dec. 8, 2005, 40 pages.
English Machine Translation of Japanese Patent Publication No. 2006-236790 A, dated Sep. 7, 2006, 36 pages.
English Machine Translation of Japanese Patent Publication No. 2010-282847 A, dated Dec. 16, 2010, 59 pages.
EPO Search Report dated Dec. 11, 2014, for corresponding European Patent application 13195590.8, (14 pages).
Patent Abstracts of Japan, and English machine translation of Japanese Publication 2006-216411 dated Aug. 17, 2006, listed above, (14 pages).
U.S. Office action dated May 7, 2015, for cross reference U.S. Appl. No. 14/049,160, (12 pages).
EPO Office action dated Aug. 26, 2015, corresponding to European Patent application 13195590.8, (11 pages).
U.S. Notice of Allowance dated Aug. 28, 2015, for cross reference U.S. Appl. No. 14/049,160, (8 pages).

* cited by examiner

BATTERY UNIT AND BATTERY MODULE USING THE SAME

CROSS-REFERENCE TO RELATED APPLICATIONS

This application claims priority to and the benefit of Korean Patent Application No. 10-2013-0038282, filed on Apr. 8, 2013, in the Korean Intellectual Property Office, the disclosure of which is incorporated herein in its entirety by reference. In addition, the present application incorporates herein by reference the entire contents of U.S. patent application Ser. No. 14/049,084, entitled BATTERY UNIT AND BATTERY MODULE USING THE SAME, filed on even date herewith; and U.S. patent application Ser. No. 14/049,160, entitled BATTERY UNIT AND BATTERY MODULE USING THE SAME, filed on even date herewith.

BACKGROUND

1. Field

One or more embodiments of the present invention relate to a battery unit and a battery module using a plurality of battery units coupled with each other.

2. Description of the Related Art

In general, secondary batteries can be discharged and recharged repeatedly, unlike primary batteries that are not designed to be recharged. Secondary batteries are used as energy sources for mobile devices, electric vehicles, hybrid cars, electric bikes, uninterruptible power supplies, etc. Also, secondary batteries are used in the form of a single battery or in the form of a battery module in which a plurality of batteries are electrically coupled in a single unit by using a bus bar, the form being in accordance with the type of an external device adopting the secondary battery.

A compact mobile device, such as a mobile phone, with the output and capacity of a single battery may operate for a predetermined time. However, when an operation of longer duration or higher power is needed, as in electric vehicles or hybrid cars, a battery module is often used to reduce or prevent an output or capacity problem. The battery module may increase an output voltage or an output current according to the number of batteries included in the battery module. The battery module may reach a desired output voltage or output current by coupling a plurality of batteries in series or in parallel.

SUMMARY

One or more embodiments of the present invention include a battery unit which may effectively support pressure during connection of a bus bar, and which may effectively dissipate heat, and a battery module including a plurality of the battery units.

Additional aspects of embodiments of the present invention will be set forth, in part, in the description which follows and, in part, will be apparent from the description, or may be learned by practice of the presented embodiments of the present invention.

According to one or more embodiments of the present invention, a battery unit includes a case accommodating an electrode assembly and having an opening, and a cap plate covering the opening, the cap plate having a terminal insertion portion. The battery unit may further include a terminal member inserted into the case through the terminal insertion portion from an exterior of the case and coupled to the electrode assembly, the terminal member including a terminal portion extending in a major side direction of the cap plate at an exterior of the cap plate, and being separated from an upper surface of the cap plate. The battery unit may further include a fixing member in the terminal insertion portion fixing the terminal member to the cap plate, the fixing member including injection-molded plastic resin in the terminal insertion portion and surrounding the terminal member. The battery unit may further include a support member coupled to the cap plate and supporting the terminal portion with respect to the cap plate.

The support member of the battery unit may include a first coupling portion, and the cap plate may include a second coupling portion having a shape that is complementary to a shape of the first coupling portion.

The support member may further include a lower support portion supported by the upper surface of the cap plate, and an upper support portion supporting a lower surface of the terminal portion, in which the first coupling portion is at the lower support portion.

The first coupling portion may include a protrusion protruding from the lower support portion, or may define a groove in the lower support portion.

The support member may include a lower support portion supported on the upper surface of the cap plate, and an upper support portion supporting a lower surface of the terminal portion, in which the upper support portion may include a rib extending upwardly from the lower support portion.

The upper support portion may have a closed shape and the upper support portion and the lower support portion may define a recessed portion that is recessed from the upper support portion toward the lower support portion.

The upper support portion may extend upwardly from an edge of the lower support portion, and the upper support portion may define one or more slot portions.

The support member may include a first position restriction portion and the terminal portion may further include a leading end surface supporting the first position restriction portion.

An upper surface of the first position restriction portion may be lower than an upper surface of the terminal portion.

The terminal member may further include a current collector electrically coupled to the electrode assembly, and a connection portion for coupling the current collector and the terminal portion. The connection portion may include a first bending portion extending downwardly from the terminal portion, and a second bending portion extending from the first bending portion in the direction along the major side of the cap plate, and the current collector portion may extend downwardly from an edge of the second bending portion in a direction along a minor side of the cap plate.

In some embodiments, the second bending portion may be partially surrounded by the fixing member.

The support member may further include a second position restriction portion partially surrounding and supporting the first bending portion.

According to one or more embodiments of the present invention, a battery module includes a plurality of battery units and a bus bar. Each battery unit includes a case accommodating an electrode assembly and having an opening, and a cap plate cover the opening, and having a terminal insertion portion. The battery unit further includes a terminal member inserted into the case through the terminal insertion portion from an exterior of the case and coupled to the electrode assembly, the terminal member having a terminal portion, extending in a major side direction of the cap plate at an exterior of the cap plate, and being separated from an upper surface of the cap plate. The battery unit further includes a fixing member in the terminal insertion portion fixing the terminal member to the cap plate and having injection-molded plastic resin in the terminal insertion portion surrounding the terminal member; and a support member coupled to the cap plate and supporting the terminal portion with respect to the cap plate. The bus bar couples the terminal portions of the battery units of the plurality of battery units to neighboring battery units of the plurality of battery units.

Each of the battery units of the battery module may further include a first coupling portion at the support member, and a second coupling portion at the cap plate, and having a shape that is complementary to a shape of the first coupling portion.

The support member of each of the battery units may include a lower support portion supported by an upper surface of the cap plate, and an upper support portion supporting a lower surface of the terminal portion, in which the first coupling portion is on the lower support portion.

The first coupling portion of each of the battery units may have a protrusion protruding from the lower support portion, or may define a groove in the lower support portion.

The support member of each of the battery units may include a lower support portion supported on the upper surface of the cap plate, and an upper support portion supporting a lower surface of the terminal portion, in which the upper support portion extends upwardly from the lower support portion.

The upper support portion of each of the battery units may have a closed shape in which the upper support portion and the lower support portion define a recessed portion that is recessed from the upper support portion toward the lower support portion.

The upper support portion of each of the battery units may extend upwardly from an edge of the lower support portion, and in which the upper support portion may define one or more slot portions.

The support member of each of the battery units may further include a first position restriction portion, and the terminal portion of each battery unit of the plurality of the battery units may further include a leading end surface supporting the first position restriction portion.

BRIEF DESCRIPTION OF THE DRAWINGS

These and/or other aspects of embodiments of the present invention will become apparent and more readily appreciated from the following description of the described embodiments, taken in conjunction with the accompanying drawings, in which.

DETAILED DESCRIPTION

Figure 1:
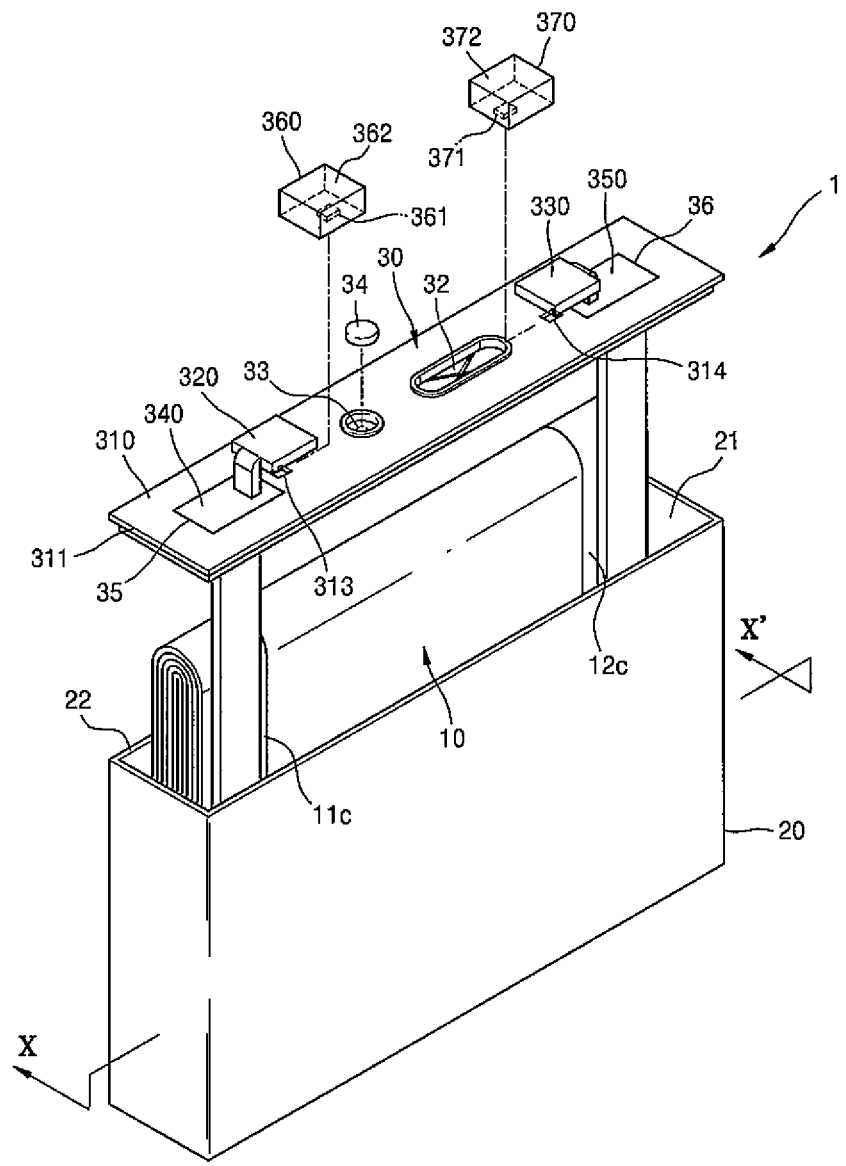
FIG. 1 is an exploded perspective view of a battery unit according to an embodiment of the present invention.

Reference will now be made in detail to embodiments of the present invention, examples of which are illustrated in the accompanying drawings, wherein like reference numerals refer to like elements throughout. In this regard, the described embodiments may have different forms and should not be construed as being limited to the descriptions set forth herein. Accordingly, certain embodiments are merely described below, by referring to the figures, to explain aspects of the present description.

As used herein, the term "and/or" includes any and all combinations of one or more of the associated listed items. Expressions such as "at least one of," when preceding a list of elements, modify the entire list of elements and do not modify the individual elements of the list. As used herein, the term "plurality" means greater than one.

Figure 2:
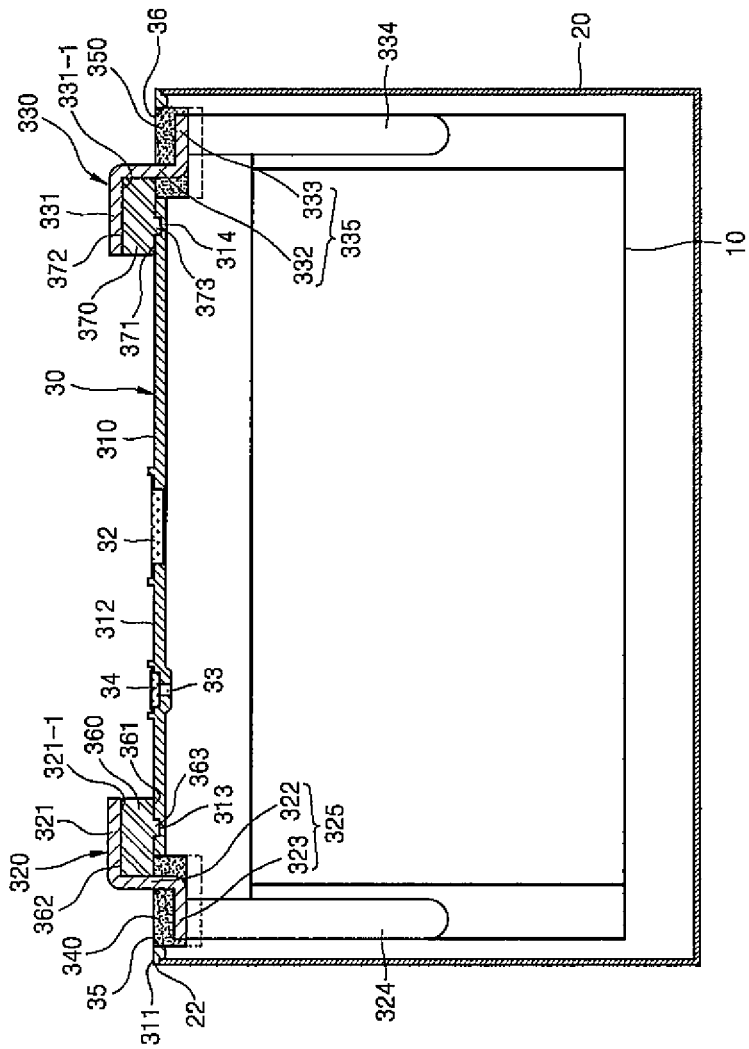
FIG. 2 is a cross-sectional view taken along the line X-X' of FIG. 1.
Figure 3:
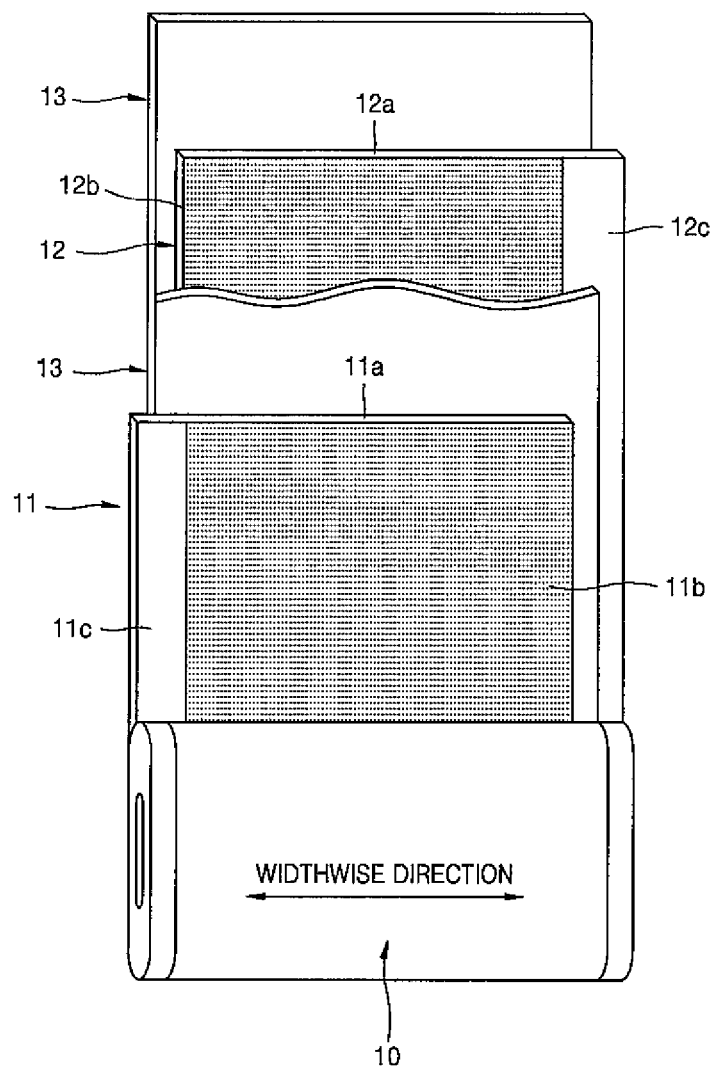
FIG. 3 is a perspective view illustrating an example of an electrode assembly of a battery unit of an embodiment of the present invention.

FIG. 1 is an exploded perspective view of a battery unit 1 according to an embodiment of the present invention. FIG. 2 is a cross-sectional view of the battery unit 1 taken along the line X-X' of FIG. 1. FIG. 3 is a perspective view illustrating an example of an electrode assembly 10. Referring to FIGS. 1 and 2, the battery unit 1 includes the electrode assembly 10, a case 20 for accommodating the electrode assembly 10, and a cap assembly 30 for closing an upper end of the case 20.

The battery unit 1 may be a secondary battery, such as a lithium ion battery. The battery unit 1 may be of a variety of types, such as a cylindrical battery unit, a prismatic battery unit, or a polymer battery unit. However, the present invention is not limited to any one of the above battery unit types.

Referring to FIG. 3, the electrode assembly 10 may include a positive plate 11, a negative plate 12, and a separator 13 interposed between the positive plate 11 and the negative plate 12. For example, the positive plate 11, the negative plate 12, and the separator 13 may be stacked and wound in a jelly-roll shape.

In some embodiments, the positive plate 11 includes a positive current collector portion 11a, and a positive active material layer 11b on at least one surface of the positive current collector portion 11a. In some embodiments, a positive material uncoated portion 11c, which is a portion where the positive active material layer 11b is not coated, is at an edge portion of the positive current collector portion 11a in a widthwise direction thereof (see FIG. 3).

Similarly, in some embodiments, the negative plate 12 includes a negative current collector portion 12a and a negative active material layer 12b on at least one surface of the negative current collector portion 12a. In some embodiments, a negative material uncoated portion 12c, which is a portion where the negative active material layer 12b is not coated is at an edge portion of the negative current collector portion 12a in a widthwise direction thereof.

The positive material uncoated portion 11c and the negative material uncoated portion 12c may be separated from each other in a widthwise direction of the electrode assembly 10. For example, the positive material uncoated portion 11c and the negative material uncoated portion 12c may be arranged at opposite edge portions of the electrode assembly 10 in the widthwise direction.

The cap assembly 30 includes a cap plate 310, terminal members 320 and 330 that are electrically coupled to the electrode assembly 10, and terminal fixing members 340 and 350 for respectively fixing the terminal members 320 and 330 to the cap plate 310. In some embodiments of the present invention, support members 360 and 370 are between an upper surface 312 (see FIG. 2) of the cap plate 310 and respective ones of terminal portions 321 and 331 (see FIG. 2) of the terminal members 320 and 330; the support members 360 and 370 may respectively support the terminal portions 321 and 331.

The case 20 has an opening 21 for inserting the electrode assembly. The opening 21 is closed when the cap plate 310 is coupled to the case 20. An edge 311 of the cap plate 310 may be shape-matched with an upper edge 22 of the case 20, which defines the opening 21. In the present embodiment, as the cap plate 310 is coupled to the case 20 by, for example, laser welding, a housing for accommodating the electrode assembly 10 is formed. The cap plate 310 includes a safety vent 32, which may be designed to be breakable to provide a gas exhaust path when the internal pressure of the case 20 becomes excessive (e.g., exceeds a preset point). The cap plate 310 includes an electrolyte injection hole 33 for injecting an electrolyte into the case 20, and which may be closed by a sealing plug 34 when injection of the electrolyte is completed.

In the present embodiment, the terminal members 320 and 330 may be a positive terminal member 320 and a negative terminal member 330, respectively, although the polarities of the terminal members 320 and 330 may be switched in other embodiments of the present invention. The positive terminal member 320 and the negative terminal member 330 are respectively electrically coupled to the positive material uncoated portion 11c of the electrode assembly 10, and to the negative material uncoated portion 12c, of the electrode assembly 10. The positive material uncoated portion 11c and the negative material uncoated portion 12c of the electrode assembly 10 may be electrically exposed to an exterior of the case 20 via the positive terminal member 320 and the negative terminal member 330, respectively. Terminal insertion portions 35 and 36 may be a positive terminal insertion portion 35 and a negative terminal insertion portion 36, respectively. The terminal insertion portions 35 and 36 may vertically penetrate the cap plate 310. The positive terminal member 320 and the negative terminal member 330 may be inserted into the terminal insertion portions 35 and 36, respectively, and fixed to the cap plate 310 by the positive terminal fixing member 340 and the negative terminal fixing member 350, respectively.

Figure 4:
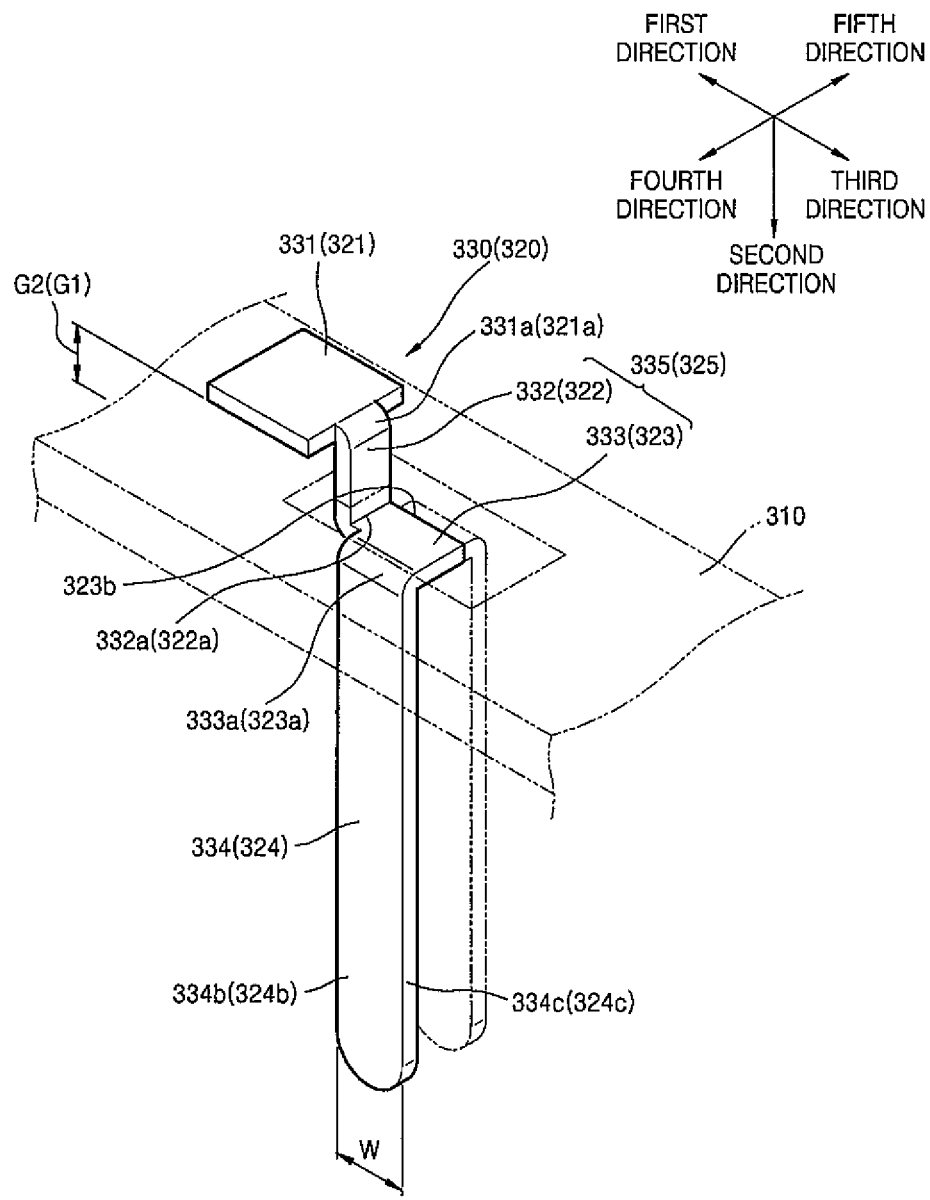
FIG. 4 is a perspective view illustrating a terminal member according to an embodiment of the present invention.

FIG. 4 is a perspective view illustrating the negative (positive) electrode terminal member 330 (320) according to an embodiment of the present invention. In the present embodiment, the terminal members 320 and 330 have the same shape, or may be symmetrical to each other. In FIG. 4, reference numerals of constituent elements forming the positive terminal member 320 are indicated in parentheses together with the reference numerals of constituent elements of the negative terminal member 330 preceding the reference numerals in the parentheses.

Referring to FIGS. 1, 2, and 4, the positive terminal member 320 may include a positive terminal portion 321, a positive current collector 324, and a positive connection portion 325, for coupling the positive terminal portion 321 and the positive current collector 324. Similarly, the negative terminal member 330 may include a negative terminal portion 331, a negative current collector 334, and a negative connection portion 335, for coupling the negative terminal portion 331 and the negative current collector 334. The negative terminal portion 331 and the positive terminal portion 321 extend parallel to an upper surface 312 of the cap plate 310. The positive terminal member 320 and the negative terminal member 330 may be a metal having electrical conductivity. For example, the positive terminal member 320 and the negative terminal member 330 may be formed by cutting and bending a metal panel member into a desired shape by a processing method including pressing.

In the present embodiment, the negative terminal portion 331 extends in a first direction (e.g., a horizontal direction) along a major side of the cap plate 310. The negative current collector 334 may extend in a second direction (e.g., a vertical direction) along a thickness direction of the cap plate 310. The negative connection portion 335 may be bent from/extend from the negative terminal portion 331 to couple the negative terminal portion 331 and the negative current collector 334. The negative connection portion 335 may include a first negative bending portion 332 bent in the second direction (e.g., downwardly), from an edge 331a of the negative terminal portion 331 corresponding to a third direction (e.g., a direction opposite to the first direction), and extending from the edge 331a of the negative terminal portion 331. The negative connection portion 335 may also include a second negative bending portion 333 bent in the third direction from an edge 332a of (e.g., a bottom of/in the second direction of) the first negative bending portion 332, and extended from the first negative bending portion 332. The negative current collector 334 may extend in the second direction (e.g., downwardly) from an edge 333a of the second negative bending portion 333 in a fourth direction (e.g., in a direction crossing, or perpendicular to, the first and second directions) in a minor side direction of the cap plate 310.

In one embodiment, a large area portion 334b of the negative current collector 334, which is perpendicular to a thickness portion 334c of the negative current collector 334, is parallel to the negative material uncoated portion 12c of the electrode assembly 10. A width W of the large area portion 334b may be such that a contact area between the large area portion 334b and the negative material uncoated portion 12c is relatively large. Thus, in the present embodiment, a large contact area between the negative current collector 334 and the negative material uncoated portion 12c may be achieved, thereby reducing contact resistance.

Figure 5A:
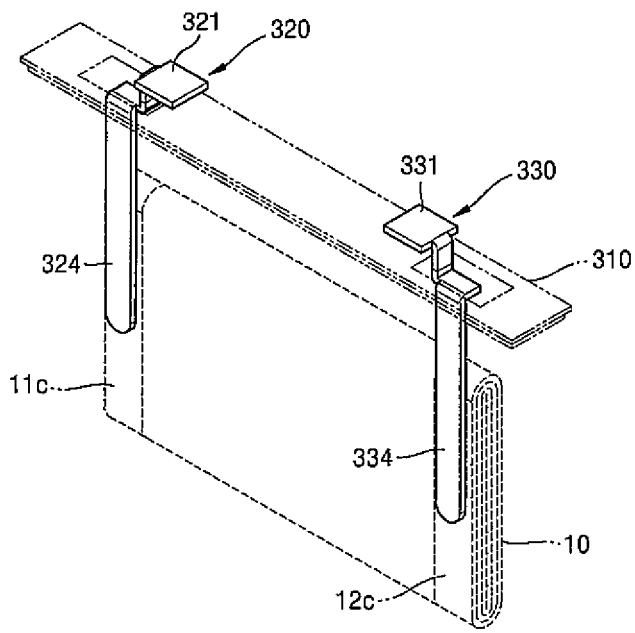
FIGS. 5A to 5C are perspective views illustrating arrangements of a positive terminal member and a positive current collector and of a negative terminal member and a negative current collector, where the current collectors are coupled on the same surface of an electrode assembly, according to an embodiment of the present invention.
Figure 5B:
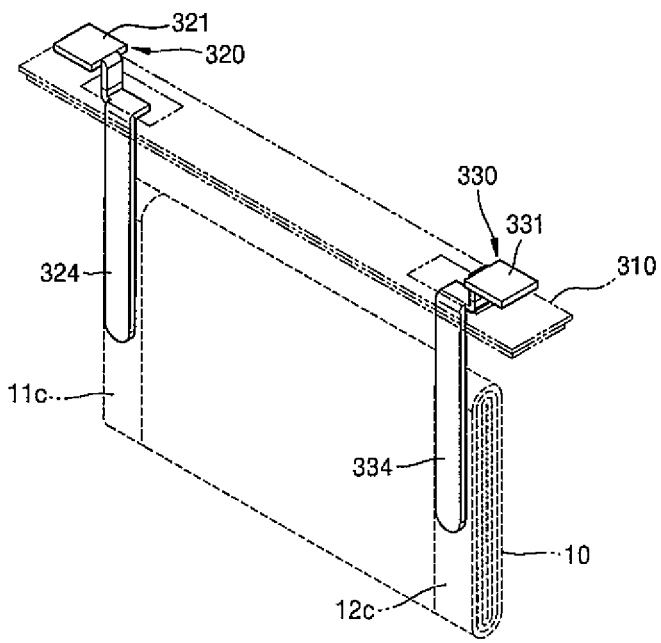
Figure 5C:
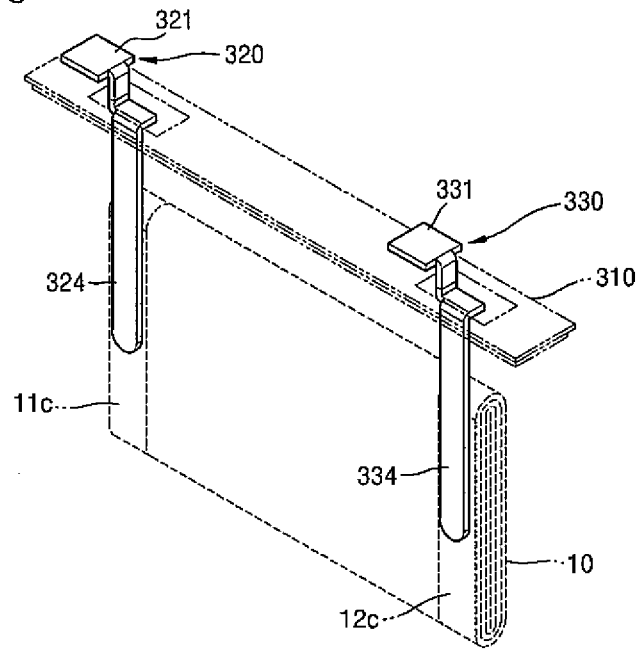

FIGS. 5A to 5C are perspective views illustrating arrangements of the positive terminal member 320 and the positive current collector 324, and of the negative terminal member 330 and the negative current collector 334. In FIGS. 5A to 5C, the positive current collector 324 and the negative current collector 334 are coupled on a same surface of the electrode assembly 10.

Referring to FIG. 5A, the positive terminal member 320 and the negative terminal member 330 may be arranged such that the positive terminal portion 321 and the negative terminal portion 331 face each other. Contrastingly, and referring to FIG. 5B, the positive terminal member 320 and the negative terminal member 330 may be arranged such that the positive terminal portion 321 and the negative terminal portion 331 face opposite directions. In the embodiments illustrated in FIGS. 5A and 5B, the positive terminal member 320 and the negative terminal member 330 have symmetrical shapes with respect to a vertical center axis of the cap plate 310 (e.g., a major side direction along the cap plate 310). Referring to FIG. 5C, the positive terminal member 320 and the negative terminal member 330 may be arranged such that the positive terminal portion 321 and the negative terminal portion 331 both face the same direction. In this embodiment, the shapes of the positive terminal member 320 and the negative terminal member 330 are the same.

Figure 6A:
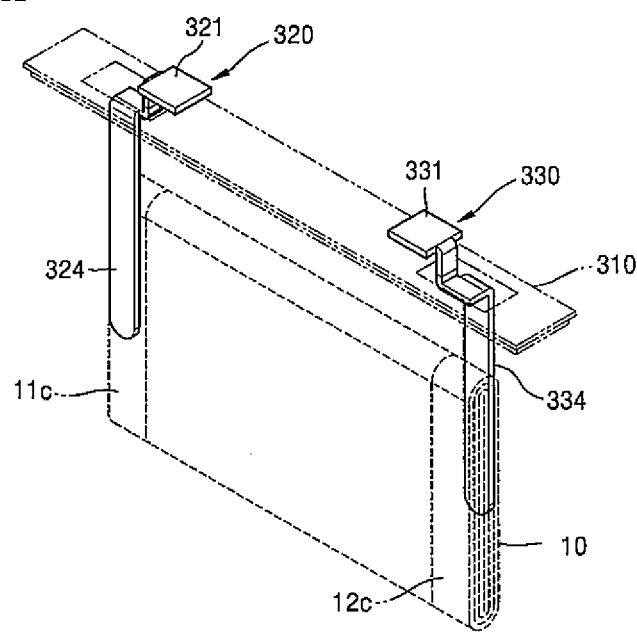
FIGS. 6A to 6C are perspective views illustrating arrangements of a positive terminal member and a positive current collector and a of negative terminal member and a negative current collector, where the current collectors are coupled on different surfaces of an electrode assembly, according to an embodiment of the present invention.
Figure 6B:
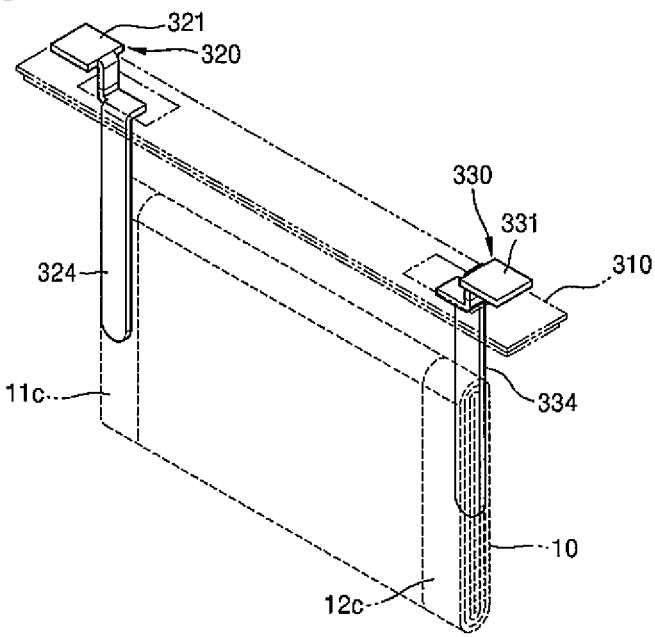
Figure 6C:
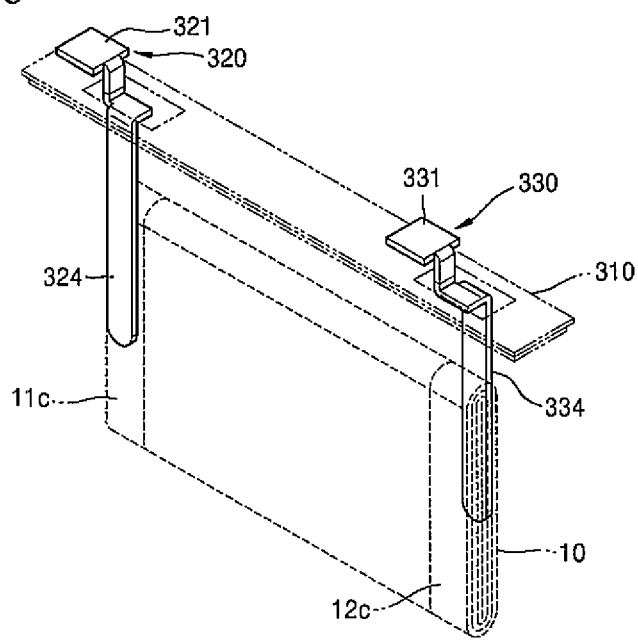

FIGS. 6A to 6C are perspective views illustrating arrangements of the positive terminal member 320 and the positive current collector 324 and of the negative terminal member 330 and the negative current collector 334. In FIGS. 6A to 6C, the positive current collector 324 and the negative current collector 334 are coupled at different surfaces of (e.g., opposite sides of) the electrode assembly 10. In the embodiments illustrated in FIGS. 6A and 6B, the positive terminal member 320 and the negative terminal member 330 have the same shape. In the embodiments illustrated in FIGS. 6A and 6B, the shapes of the positive terminal member 320 and the negative terminal member 330 are symmetrical to a vertical, central axis of the cap plate 310 (e.g., symmetrical to each other with respect to the major side direction along the cap plate 310).

In embodiments where the shape of the positive terminal member 320 is the same as that of the negative terminal member 330, as illustrated in FIG. 4, for example, the positive terminal member 320 includes the positive terminal portion 321 extending in the first direction, the positive current collector 324 extending in the second direction, and the positive connection portion 325 having a first positive bending portion 322 bending from the positive terminal portion 321 and coupling the positive terminal portion 321, and also having a second positive bending portion 333 bending from the positive current collector 324, and the positive current collector 324. The first positive bending portion 322 is bent/extends in the second direction from an edge 321a of the positive terminal portion 321 (the edge 321a being in the third direction of the positive terminal portion 321), and the second positive bending portion 323 is bent/extends in the third direction from an edge 322a of the first positive bending portion 322 (the edge 322a being in the second direction of the first positive bending portion 322). The positive current collector 324 may be bent/extend in the second direction from an edge 323a of the second positive bending portion 323 (the edge 323a being in the fourth direction of the second positive bending portion 323).

In some embodiments, a large area portion 324b of the positive current collector 324, which is perpendicular to a thickness portion 324c, of the positive current collector 324, is parallel to the positive material uncoated portion 11c of the electrode assembly 10. The width W of the large area portion 324b may be such that a contact area between the large area portion 324b and the positive material uncoated portion 11c is large (e.g., the width W corresponds to the size of the positive material uncoated portion 11c). Thus, in this embodiment, a large contact area between the positive current collector 324 and the positive material uncoated portion 11c may be achieved, thereby reducing contact resistance.

In embodiments of the present invention where the positive terminal member 320 is symmetrical to the negative terminal member 330, as indicated by a dashed line of FIG. 4 (e.g., the positive terminal member 320 of FIGS. 5A and 6A), for example, the positive current collector 324 may be bent in the second direction from a second edge 323b of the second positive bending portion 323 (the second edge 323b being in a fifth direction, which is opposite to the fourth direction, of the second positive bending portion 323).

In some embodiments, the positive terminal member 320 and the negative terminal member 330 are respectively inserted in the positive terminal insertion portion 35 and the negative terminal insertion portion 36. In these embodiments, the positive terminal portion 321 and the negative terminal portion 331 are located above the cap plate 310, whereas the positive current collector 324 and the negative current collector 334 are located under the cap plate 310. In these embodiments, the positive terminal member 320 and the negative terminal member 330 are each respectively fixed to the cap plate 310 by the positive terminal fixing member 340 and by the negative terminal fixing member 350, which are respectively inserted into the positive terminal insertion portion 35 and into the negative terminal insertion portion 36. The positive terminal fixing member 340 and the negative terminal fixing member 350 may be formed of, for example, electrical insulation plastic. The positive terminal portion 321 and the negative terminal portion 331 may protrude above from the cap plate 310. In some embodiments, gaps G1 and G2 (see FIG. 4) are respectively formed between the upper surface 312 of the cap plate 310 and each of the positive terminal portion 321 and the negative terminal portion 331. Accordingly, the positive terminal portion 321 and the negative terminal portion 331 may be fixed to/coupled to the cap plate 310, and may be electrically insulated from the cap plate 310 by the positive terminal fixing member 340 and the negative terminal fixing member 350, respectively.

The electrical insulation may include plastic. For example, in some embodiments, the electrical insulation includes common plastics such as polyvinyl chloride (PVC), polystyrene, high density polyethylene, and acrylonitrile butadiene styrene copolymer (ABS); common engineering plastics such as polyacetal, polyphenylene oxide (PPO), polyphenylene ether (PPE), polyamide (PA), polycarbonate (PC), and polybutylene terephthalate (PBT); high performance engineering plastics such as U-polymer, polysulfone (PSU), polyphenylene sulfide (PPS), polyetherimide (PEI), polyethersulfone (PES), polyacrylate, polyetheretherketone (PEEK), and polytetrafluoroethylene (PTFE); and super heat resisting engineering plastics such as polyamide-imide (PAI) and polyimide (PI). In one embodiment, the positive terminal fixing member 340 and the negative terminal fixing member 350 may be formed of resin produced by adding 40% fiberglass to PPS.

The positive terminal fixing member 340 and the negative terminal fixing member 350 may be formed by an insert injection molding method. In some embodiments, this method includes respectively inserting the positive terminal member 320 and the negative terminal member 330, into the positive terminal insertion portion 35 and into the negative terminal insertion portion 36. The method further may include injecting a material such as an electrical insulation, for example the resin produced by adding 40% fiberglass to PPS describe above, to mold into the positive terminal insertion portion 35 and the negative terminal insertion portion 36. For example, the embodiments shown in FIGS. 7A to 7C illustrate an example of a process for fixing the positive terminal member 320 and the negative terminal member 330 to the cap plate 310, and for forming the positive and negative terminal fixing members 340 and 350 in an insert injection molding method.

Figure 7A:
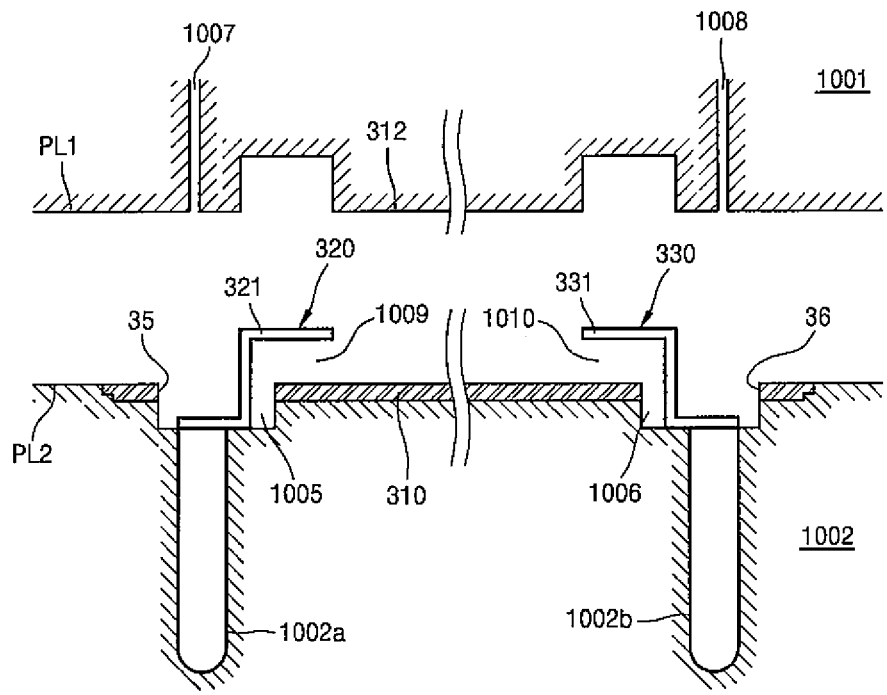
FIGS. 7A to 7C illustrate an example of a process for fixing a positive terminal member and a negative terminal member to a cap plate, and for forming a fixing member through an insert injection molding method.

Referring to FIG. 7A, an upper core 1001 and a lower core 1002 of an injection mold may be separated from each other, thereby opening the injection mold. In some embodiments, the cap plate 310 is placed on a lower parting line PL2 of the lower core 1002, and the positive terminal member 320 and the negative terminal member 330 are inserted into the lower core 1002 by passing through the cap plate 310 via the positive terminal insertion portion 35 and the negative terminal insertion portion 36, respectively. Support holes 1002a and 1002b for respectively supporting the positive current collector 324 and the negative current collector 334 may be provided in the lower core 1002. In these embodiments, when the positive current collector 324 and the negative current collector 334 are supported by the support holes 1002a and 1002b, respectively, the positive terminal portion 321 and the negative terminal portion 331 are separated from the upper surface 312 of the cap plate 310. To prevent gaps 1009 and 1010, which are respectively between the positive terminal portion 321 and the negative terminal portion 331 and the upper surface 312 of the cap plate 310, from being filled with, for example the plastic resin, the gaps 1009 and 1010 may be filled with the upper core 1001. The gaps 1009 and 1010 correspond to under-cut portions with respect to an operational direction of the upper core 1001 (e.g., a vertical direction in FIGS. 7A-7C). The gaps 1009 and 1010 may be respectively filled with slide cores 1003 and 1004 that move in a direction (e.g., a horizontal direction in FIGS. 7A-7C) crossing the operational direction of the upper core 1001 when operated. In other words, when the upper core 1001 approaches, or is separated from, the lower core 1002, the slide cores 1003 and 1004 may move in the direction crossing the operational direction of the upper core 1001, thereby respectively filling the gaps 1009 and 1010, or being moved away from the gaps 1009 and 1010.

Figure 7B:
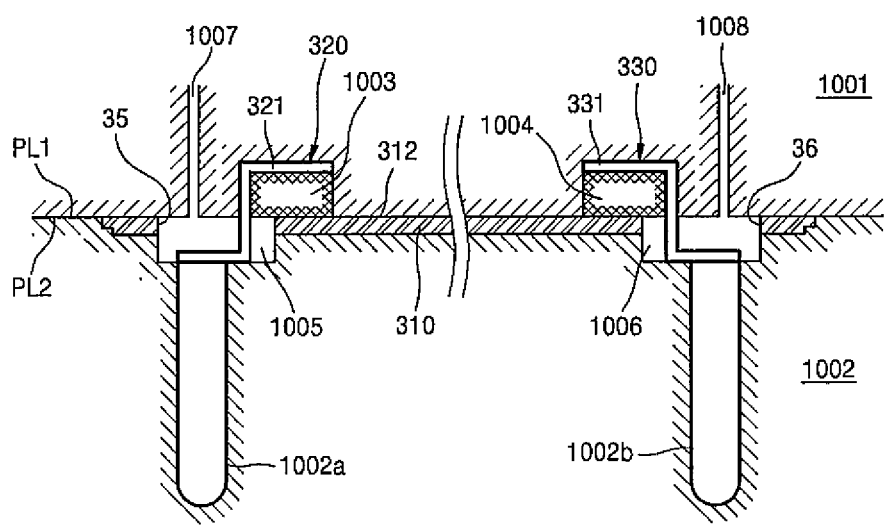

Referring to the embodiment illustrated in FIG. 7B, the upper core 1001 approaches the lower core 1002 once the cap plate 310, the positive terminal member 320, and the negative terminal member 330 are all supported on the lower core 1002. When the upper core 1001 and the lower core 1002 are coupled to each other, molding spaces 1005 and 1006 (where the positive terminal fixing member 340 and the negative terminal fixing member 350 are to be respectively formed) may be defined by an upper parting line PL1 and the lower parting line PL2. In these embodiments, the gaps 1009 and 1010 are filled by the slide cores 1003 and 1004, respectively. In these embodiments, the molding spaces 1005 and 1006 are respectively filled through gates 1007 and 1008 with a material (e.g., a resin). In these embodiments, once adequate cooling has occurred (e.g., once a predetermined cooling time passes) and the material, for example resin, filling the molding spaces 1005 and 1006 cures, the positive terminal fixing member 340 and the negative terminal fixing member 350, which respectively fix the positive terminal member 320 and the negative terminal member 330 to the cap plate 310, are formed.

Figure 7C:
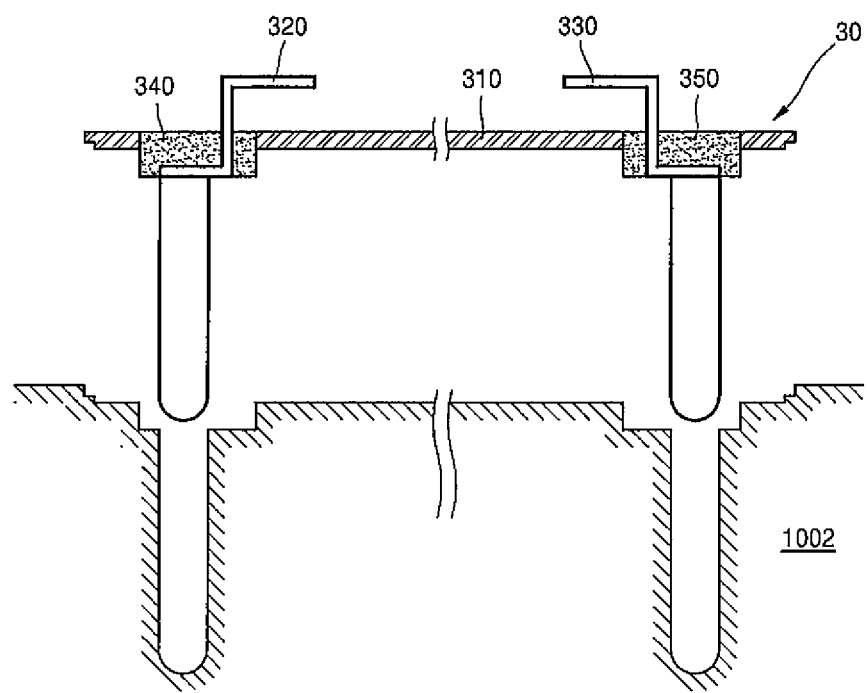

Next, referring to the embodiment illustrated in FIG. 7C, the upper core 1001 is separated from the lower core 1002, and the cap assembly 30 is separated from the lower core 1002. Referring back to FIG. 2, the positive terminal fixing member 340 and the negative terminal fixing member 350 may partially or entirely surround the positive connection portion 325 and the negative connection portion 335, respectively. Gaps between the positive and negative connection portions 325 and 335 and the respective terminal insertion portions 35 and 36 of the cap plate 310 may be filled with a material, for example resin, thereby forming the positive terminal fixing member 340 and the negative terminal fixing member 350, respectively. Accordingly, in these embodiments, the positive terminal member 320 and the negative terminal member 330 may be electrically insulated from the cap plate 310. The second positive bending portion 323 and the second negative bending portion 333 may be partially or entirely (refer to the dashed line of FIG. 2) buried in the positive terminal fixing member 340 and the negative terminal fixing member 350, respectively. In these embodiments, as the positive connection portion 325 and the negative connection portion 335, each having bending portions 322, 323, 332, and 333, are buried in the positive terminal fixing member 340 and the negative terminal fixing member 350, respectively, the positive terminal member 320 and the negative terminal member 330 are each respectively coupled to the cap plate 310 by the positive terminal fixing member 340 and the negative terminal fixing member 350, and improving a coupling strength between the positive terminal member 320 and the negative terminal member 330 and the cap plate 310.

The positive terminal portion 321 and the negative terminal portion 331 may be separated from the upper surface 312 of the cap plate 310, forming gaps G1 and G2 between the cap plate 310 and the terminal portions 321 and 331. The gaps G1 and G2 may be the same. Support members 360 and 370 may be respectively disposed in the gaps G1 and G2, and may be supported on the upper surface 312 of the cap plate 310 and on each of respective lower surfaces 321-1 and 331-1 (see FIG. 2) of the positive and negative terminal portions 321 and 331. Referring to FIGS. 1 and 2, the support members 360 and 370 respectively include lower support portions 361 and 371 at/supported on the upper surface 312 of the cap plate 310, and upper support portions 362 and 372 at/supported on the lower surfaces 321-1 and 331-1 of the respective positive and negative terminal portions 321 and 331.

In some embodiments, the support members 360 and 370 are respectively provided with first coupling portions 363 and 373 (see FIG. 2). For example, the first coupling portions 363 and 373 may be respectively provided on the lower support portions 361 and 371. Second coupling portions 313 and 314 having a shape complementary to that of the first coupling portions 363 and 373 may be located on the cap plate 310. For example, the first coupling portions 363 and 373 may have a shape of a protrusion protruding from the lower support portions 361 and 371, while the second coupling portions 313 and 314 may have a shape of a groove recessed downwardly from the upper surface 312 of the cap plate 310. In some embodiments, the shape of the groove may not completely pass through the cap plate 310 (e.g., for respectively receiving the protrusion-shaped lower support portions 361 and 371). Alternatively, the first coupling portions 363 and 373 may have a shape of a groove recessed from the lower support portions 361 and 371, whereas the second coupling portions 313 and 314 may have a shape of a protrusion protruding upwardly from the upper surface 312 of the cap plate 310.

The support members 360 and 370 may be moved horizontally and inserted into the gaps G1 and G2 as illustrated in FIG. 1. The cap plate 310 may be, for example, a metal plate so as to be slightly elastically deformable. Also, the positive and negative terminal portions 321 and 331 may be slightly elastically deformable with respect to the first positive and negative bending portions 322 and 332. Accordingly, in the process of inserting the support members 360 and 370 into respective gaps G1 and G2, the positive and negative terminal portions 321 and 331 and/or the cap plate 310 may be deformed in a direction resulting in a slight increase in a size of the gaps G1 and G2. In some embodiments, when the first coupling portions 363 and 373 and the second coupling portions 313 and 314 are coupled to each other, the positive and negative terminal portions 321 and 331 and/or the cap plate 310 are elastically returned to the original state so that the support members 360 and 370 may be placed in the gaps G1 and G2, respectively.

The support members 360 and 370 may be formed of, for example, the above-described electrically insulating plastic, and may be formed of resin obtained by adding 40% fiberglass to PPS.

The completed cap assembly 30 may include the electrode assembly 10, the positive terminal member 320, and the negative terminal member 330 electrically coupled to one another. In some embodiments, the positive current collector 324 is electrically coupled to the positive material uncoated portion 11c, whereas the negative current collector 334 is electrically coupled to the negative material uncoated portion 12c. The coupling of the positive current collector 324 to the positive material uncoated portion 11c and the coupling of the negative current collector 334 to the negative material uncoated portion 12c may be, for example, by ultrasound/ultrasonic welding.

Once the cap assembly 30 and the electrode assembly 10 are coupled to each other, the electrode assembly 10 may be inserted into the case 20 through the opening 21. In these embodiments, once the cap plate 310 is coupled to the case 20 by, for example, a laser welding method, the opening 21 is closed, while the electrode assembly 10 is electrically exposed to the exterior of the case 20 via the positive terminal member 320 and the negative terminal member 330. After the opening 21 is closed, an electrolyte may be injected through the electrolyte injection hole 33, and the electrolyte injection hole 33 may be closed by using the sealing plug 34, thus completing the manufacturing of the battery unit 1.

According to the above-described battery unit 1, each of the positive terminal member 320 and the negative terminal member 330 may be formed by a single metal plate. In other words, all components of the positive terminal member 320 and the negative terminal member 330 from the positive current collector 324 and the negative current collector 334 to the positive terminal portion 321 and the negative terminal portion 331 may be formed of the same metal. Thus, because the positive terminal member 320 and the negative terminal member 330 may be formed without the need for a coupling process by welding, etc., the manufacturing cost may be reduced while maintaining an electrical characteristic of a current path from the positive current collector 324 and the negative current collector 334 to the positive terminal portion 321 and the negative terminal portion 331, respectively. Also, as the positive terminal member 320 and the negative terminal member 330 are coupled to the cap plate 310 by the insert injection molding method using, for example plastic or resin, the cap plate 310 may be coupled to the positive terminal member 320, to the negative terminal member 330, and to the electrical insulation therebetween.

Figure 13:
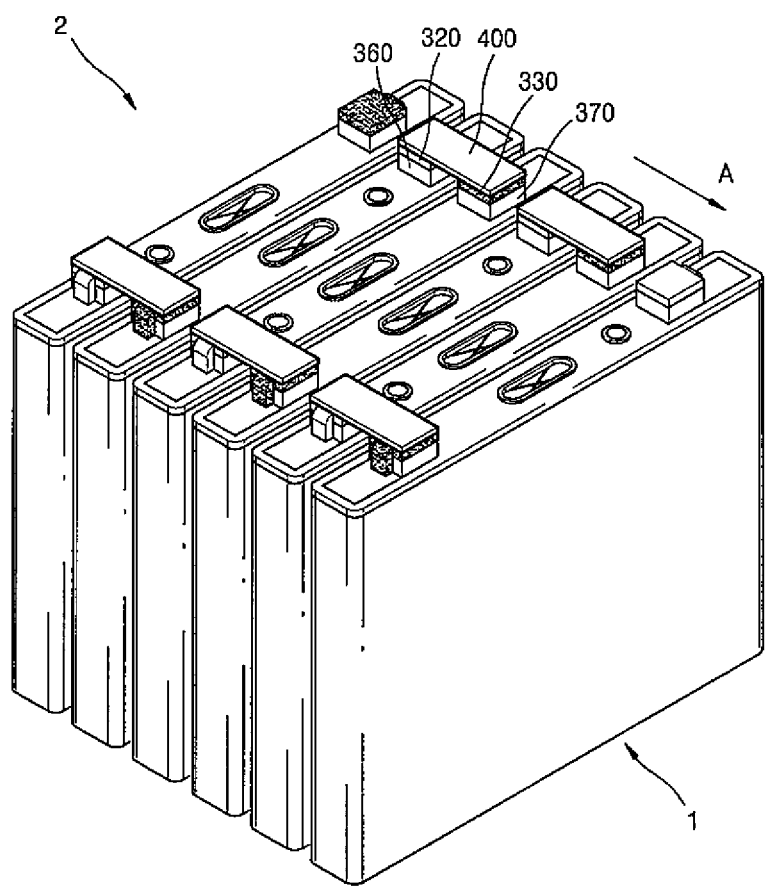
FIG. 13 is a perspective view of a battery module according to an embodiment of the present invention.

In embodiments where the positive terminal portion 321 and the negative terminal portion 331 extend parallel to each other and to the upper surface 312 of the cap plate 310, for example in a horizontal direction, this may allow for a more streamlined coupling of the positive terminal portion 321 and the negative terminal portion 331 of neighboring battery units 1 forming a battery module 2, as illustrated in FIG. 13. Also, the positive terminal portion 321 and the negative terminal portion 331, extending, for example, in a horizontal direction, may be advantageous in allowing a sufficient area for welding.

A downward pressure may be applied to the positive terminal portion 321 and the negative terminal portion 331 by a welding tool during a welding process for forming the battery module 2 illustrated in FIG. 13. In this embodiment, because the positive terminal portion 321 and the negative terminal portion 331 are supported by the support members 360 and 370, the possibility of the positive terminal fixing member 340 and the negative terminal fixing member 350 being separated from the respective positive terminal insertion portion 35 and the negative terminal insertion portion 36 during the welding process may be reduced. Also, the possibility of a welding defect occurring due to the downward deformation of the positive terminal portion 321 and the negative terminal portion 331 may be reduced. In addition, an electrical short-circuit with the cap plate 310 resulting from the downward deformation of the positive terminal portion 321 and the negative terminal portion 331 may be avoided or prevented.

Figure 8:
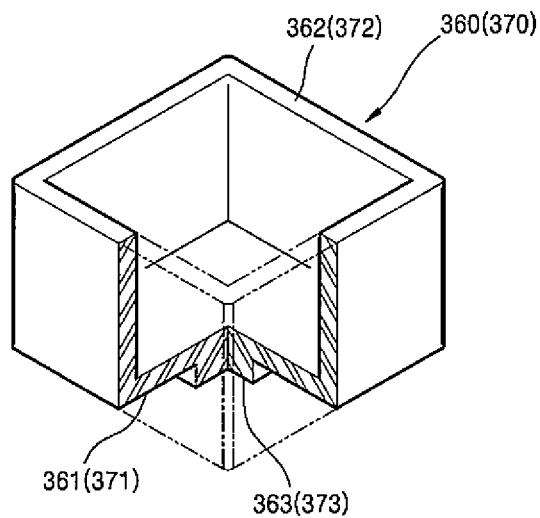
FIG. 8 is a partial cut-away perspective view of a support member according to an embodiment of the present invention.

FIG. 8 is a partial cut-away perspective view of the support members 360 and 370 according to an embodiment of the present invention. Referring to FIG. 8, the support members 360 and 370 partially support the lower surfaces 321-1 and 331-1 of the positive terminal portion 321 and the negative terminal portion 331, respectively. For example, the upper support portions 362 and 372 may have a shape of a rib that extends upwardly from the lower support portions 361 and 371. In these embodiments, a contact area between the lower surfaces 321-1 and 331-1 of the respective positive terminal portion 321 and the negative terminal portion 331 and the support members 360 and 370 decreases, thus the deformation of the support members 360 and 370 due to heat in a welding process may be reduced.

Figure 9:
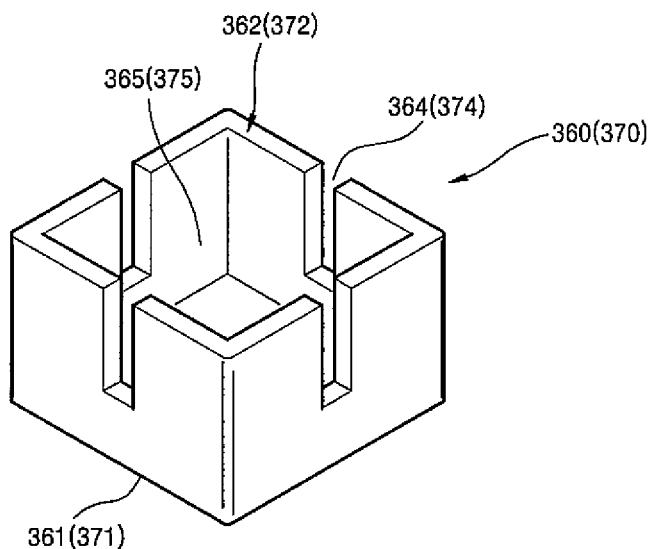
FIG. 9 is a partial cut-away perspective view of a support member according to another embodiment of the present invention.

In FIG. 8, the upper support portions 362 and 372 are upwardly extended from edges of the lower support portions 361 and 371. However, the present invention is not limited thereto. For example, as illustrated in FIG. 9, the upper support portions 362 and 372 may define/may be divided by one or more slot portions 364 and 374. In other words, internal spaces 365 and 375, defined by the upper support portions 362 and 372 having rib shapes, and by the lower support portions 361 and 371, may communicate with the outside through the slot portions 364 and 374. In these embodiments, because the contact area between the lower surfaces 321-1 and 331-1 of the respective positive terminal and negative terminal portions 321 and 331 and the support members 360 and 370 decreases, the amount of heat transferred during the welding process may be further reduced. Also, because the internal spaces 365 and 375 may communicate with the outside through the slot portions 364 and 374, heat energy applied to the positive terminal portion 321 and the negative terminal portion 331 during the welding process may be effectively distributed.

Figure 10:
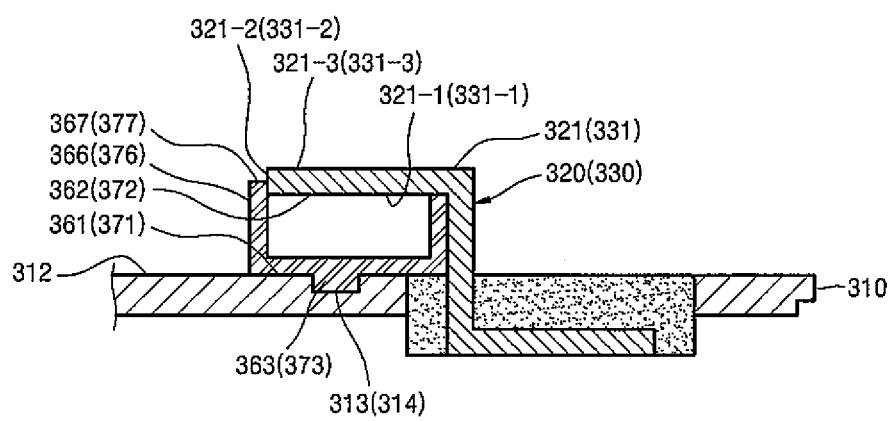
FIGS. 10 and 11, respectively, are a cross-sectional view, and a partial cut-away perspective view, of a support member according to another embodiment of the present invention.
Figure 11:
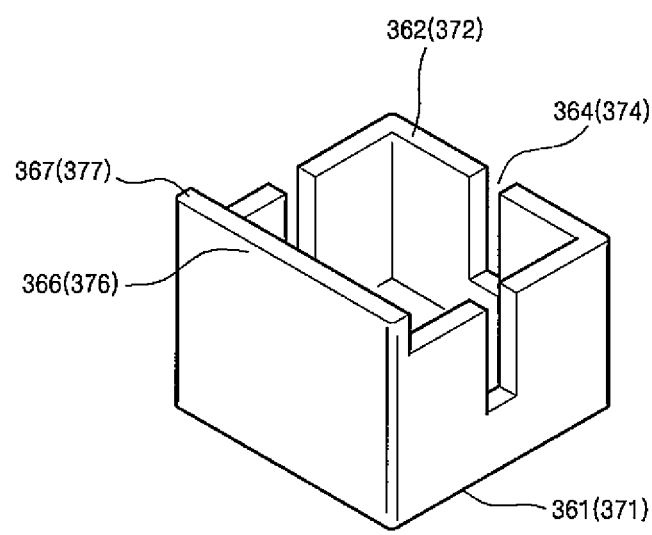

FIGS. 10 and 11, respectively, are a cross-sectional view and a partial cut-away perspective view of the support members 360 and 370 according to another embodiment of the present invention. Referring to FIGS. 10 and 11, the support members 360 and 370 include first position restriction portions 366 and 376 that are supported on leading end surfaces 321-2 and 331-2 of the respective positive terminal portion 321 and the negative terminal portion 331. That is, the first position restriction portions 366 and 376 may be supported by an end portion of the positive and negative terminal portions 321 and 331 that is opposite the first bending portions 322 and 332. In some embodiments, upper surfaces 367 and 377 of the first position restriction portions 366 and 376 are located lower than upper surfaces 321-3 and 331-3 of the respective positive terminal portion 321 and negative terminal portion 331. The first position restriction portions 366 and 376 and the first coupling portions 363 and 373 may restrict movements of the support members 360 and 370 in an insertion direction.

Figure 12:
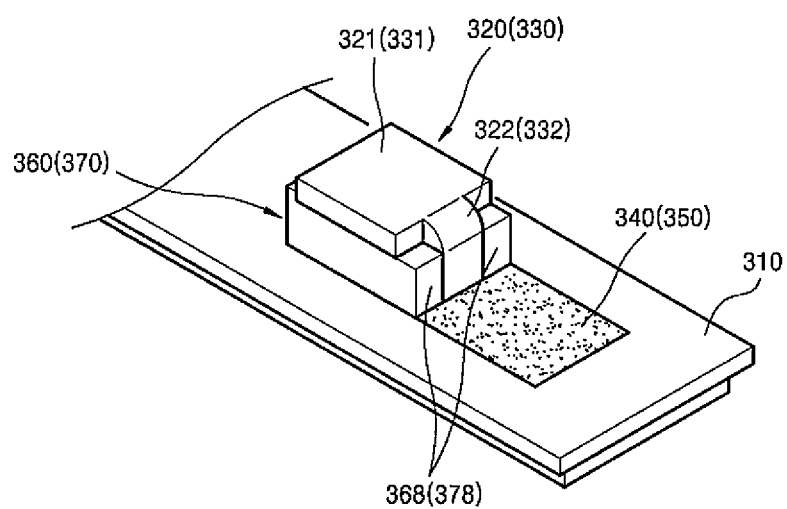
FIG. 12 is a perspective view illustrating a terminal member and a support member supported on a cap plate, according to an embodiment of the present invention.

FIG. 12 is a perspective view illustrating the terminal members 320 and 330 and the support members 360 and 370 supported on the cap plate 310, according to an embodiment of the present invention. Referring to FIG. 12, the support members 360 and 370 include second position determination portions 368 and 378 that are supported by opposite side portions of the second bending portions 323 and 333 of the respective positive and negative terminal members 320 and 330 (e.g., the second bending portion 323 fits in a groove defined by the second position determination portion 368). The second position determination portions 368 and 378 may restrict movement of the support members 360 and 370 in a direction crossing the insertion direction thereof (e.g., crossing the horizontal direction in which the support members 360 and 370 are inserted).

FIG. 13 is a perspective view of the battery module 2 according to an embodiment of the present invention. Referring to FIG. 13, the battery module 2 may include a plurality of battery units 1 arranged in a row. For example, the battery module 2 may include the battery units 1 in one direction or in a stacked structure wherein the battery units 1 are arranged in one or more rows.

The battery units 1 may be electrically coupled to one another in series or in parallel by coupling respective ones of the positive terminal portion 321 and the negative terminal portion 331 of neighboring battery units 1. For example, as illustrated in FIG. 13, the battery units 1 may be coupled to each other in series by coupling the terminal portions 321, 331 of different polarities of a pair of neighboring battery units 1 by using a bus bar 400. In the present embodiment, the battery units 1 may be arranged such that the polarities of the terminal portions 321, 331 are alternately arranged in a coupling direction A of the bus bar 400. The bus bar 400 may be coupled to the positive terminal portion 321 and the negative terminal portion 331 by welding, for example. Although it is not illustrated in FIG. 13, the battery units 1 may be coupled in parallel to each other by coupling the terminal portions 321, 331 of the same polarity of a pair of neighboring battery units 1 by using a bus bar 400.

The bus bar 400 may be formed of a metal material exhibiting superior conductivity, and may be formed of a metal material having a uniform composition. When the positive terminal portion 321 and the negative terminal portion 331 each are formed of a similar metal to that of the bus bar 400, each of the positive terminal portion 321 and the negative terminal portion 331 and the bus bar 400 may be coupled by welding the similar metals. In some embodiments, the similar metal may include, for example, aluminum (Al) and/or copper (Cu).

In other embodiments of the present invention, the positive terminal portion 321 and the negative terminal portion 331 may be dissimilar metals. When the bus bar 400 is formed of a metal material that is different from of the material of the positive terminal portion 321 and/or the negative terminal portion 331, the coupling between dissimilar metals may be formed between the positive terminal portion 321 and the bus bar 400, and/or between the negative terminal portion 331 and the bus bar 400. When the bus bar 400 is formed of a similar metal as any one of the positive terminal portion 321 and/or the negative terminal portion 331, the coupling between dissimilar metals may be between the bus bar 400 and the one of the positive terminal portion 321 and the negative terminal portion 331 that is a metal that is dissimilar to that of the bus bar 400.

For example in one embodiment, laser welding between similar metals may result in a sufficient welding strength; example similar metals may include, Al—Al or Cu—Cu. However, if the laser welding in these embodiments is between dissimilar metals such as Al—Cu, for example, weldability is degraded and a sufficient welding strength might not be achieved. In embodiments having dissimilar metals, friction stir welding (FSW) may be performed instead of laser welding. FSW uses a welding tool inserted in a base member rotated at a high speed. The base members around the welding tool may be softened due to frictional heat between the welding tool and the base members. Plastic flow resulting from an agitation operation by the rotating welding tool allows two base members to be forcibly mixed with each other with respect to a boundary surface of the two base members. Thus, FSW may provide a sufficient welding strength between dissimilar metals having lower weldability.

For example, in one embodiment of the present invention, the positive terminal portion 321 may be formed of Al that is electrochemically suitable for a positive electrode, the negative terminal portion 331 may be formed of Cu that is electrochemically suitable for a negative electrode, and the bus bar 400 may be formed of Al. The positive terminal portion 321 and the bus bar 400 may be coupled by laser welding, whereas the negative terminal portion 331 and the bus bar 400 may be coupled by FSW. Accordingly, in this embodiment, a sufficient welding strength between the bus bar 400 and each of the positive terminal portion 321 and the negative terminal portion 331 may be achieved. In other embodiments, both of the positive terminal portion 321 and the negative terminal portion 331 may be coupled to the bus bar 400 by FSW.

Figure 14:
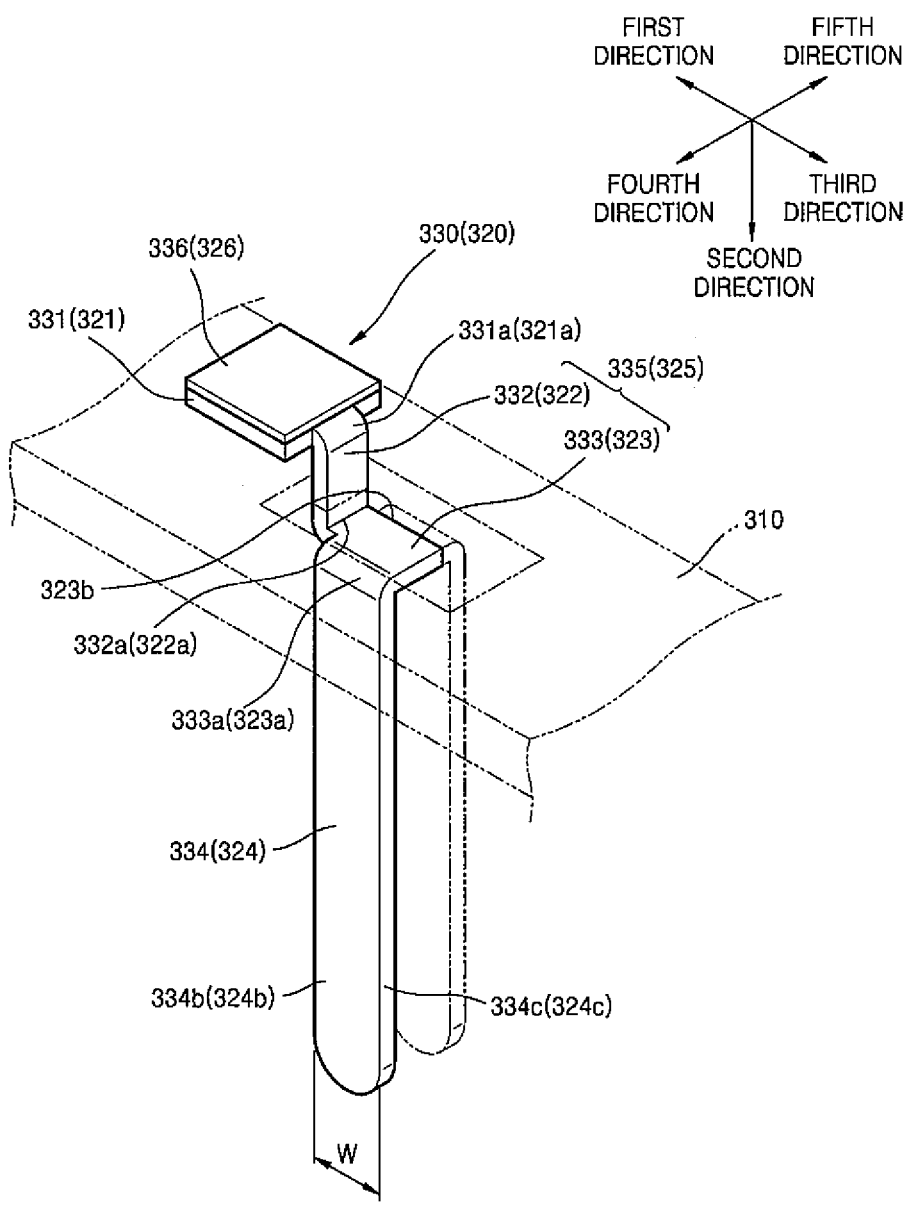
FIG. 14 is a perspective view illustrating a terminal member according to another embodiment of the present invention.

FIG. 14 is a perspective view of the positive terminal member 320 and the negative terminal member 330 applied to the battery unit 1, according to another embodiment of the present invention. When the positive terminal portion 321 and the negative terminal portion 331 are of dissimilar metals, and when the bus bar 400 is of a metal that is similar to one of, and dissimilar to the other of, the positive terminal portion 321 and the negative terminal portion 331, the terminal portion 321/331 that is dissimilar to the bus bar 400 may include a welding layer 326 or 336 of a similar metal to the bus bar 400. For example, when the positive terminal portion 321 is formed of Al that is electrochemically suitable for a positive electrode, the negative terminal portion 331 may be formed of Cu that is electrochemically suitable for a negative electrode, and the bus bar 400 may be formed of Al, the welding layer 336 formed of Al (the same material as the bus bar 400) may be on an upper surface of the negative terminal member 330. When the bus bar 400 is formed of Cu, the welding layer 326 formed of Cu (the same material as the bus bar 400) may be on the upper surface of the positive terminal portion 321. The welding layers 326 and 336 may be on the positive terminal portion 321 and the negative terminal portion 331, respectively, by laser welding or FSW. In some embodiments, the gaps G1 and G2 may be different from each other to allow for the final heights of the upper surfaces of the positive terminal portion 321 and the negative terminal portion 331 to be the same. According to the above embodiment, because the coupling between the bus bar 400 and each of the positive terminal portion 321 and the negative terminal portion 331 is between similar metals, a sufficient welding strength may result even by laser welding.

It should be understood that the exemplary embodiments described herein should be considered in a descriptive sense only and not for purposes of limitation. Descriptions of features or aspects within each embodiment should typically be considered as available for other similar features or aspects in other embodiments. The scope of the present disclosure is defined in the claims and their equivalents.

What is claimed is:

1. A battery unit comprising:
a case accommodating an electrode assembly and having an opening;
a cap plate covering the opening, the cap plate having a terminal insertion portion;
a terminal member inserted into the case through the terminal insertion portion from an exterior of the case and coupled to the electrode assembly, the terminal member comprising a terminal portion extending in a major side direction of the cap plate at an exterior of the cap plate and being separated from an upper surface of the cap plate;
a fixing member in the terminal insertion portion and fixing the terminal member to the cap plate, the fixing member comprising injection-molded plastic resin in the terminal insertion portion and surrounding the terminal member; and
a support member coupled to the cap plate and supporting the terminal portion with respect to the cap plate, the support member comprising:
a lower support portion supported by the upper surface of the cap plate;
an upper support portion comprising a rib extending upwardly from the lower support portion and supporting a lower surface of the terminal portion; and
a first position restriction portion extending above an upper surface of the rib of the upper support portion,
wherein the terminal portion comprises a leading end surface supporting the first position restriction portion.

2. The battery unit of claim 1, wherein the support member further comprises a first coupling portion, and the cap plate comprises a second coupling portion having a shape that is complementary to a shape of the first coupling portion.

3. The battery unit of claim 2, wherein the first coupling portion is at the lower support portion.

4. The battery unit of claim 3, wherein the first coupling portion comprises a protrusion protruding from the lower support portion, or defines a groove in the lower support portion.

5. The battery unit of claim 1, wherein the upper support portion comprises a closed shape, and wherein the upper support portion and the lower support portion define a recessed portion that is recessed from the upper support portion toward the lower support portion.

6. The battery unit of claim 1, wherein the upper support portion extends upwardly from an edge of the lower support portion, and wherein the upper support portion defines one or more slot portions.

7. The battery unit of claim 1, wherein an upper surface of the first position restriction portion is lower than an upper surface of the terminal portion.

8. The battery unit of claim 1, wherein the terminal member further comprises a current collector electrically coupled to the electrode assembly, and a connection portion for coupling the current collector and the terminal portion,
wherein the connection portion comprises a first bending portion extending downwardly from the terminal portion, and a second bending portion extending from the first bending portion in the direction along the major side of the cap plate, and
wherein the current collector extends downwardly from an edge of the second bending portion in a direction along a minor side of the cap plate.

9. The battery unit of claim 8, wherein the second bending portion is partially surrounded by the fixing member.

10. The battery unit of claim 8, wherein the support member further comprises a second position restriction portion partially surrounding and supporting the first bending portion.

11. A battery module comprising:
a plurality of battery units, the battery units each comprising:
a case accommodating an electrode assembly and having an opening;
a cap plate covering the opening, the cap plate having a terminal insertion portion;
a terminal member inserted into the case through the terminal insertion portion from an exterior of the case and coupled to the electrode assembly, the terminal member comprising a terminal portion extending in a major side direction of the cap plate at an exterior of the cap plate and being separated from an upper surface of the cap plate;
a fixing member in the terminal insertion portion and fixing the terminal member to the cap plate, the fixing member comprising injection-molded plastic resin in the terminal insertion portion and surrounding the terminal member; and
a support member coupled to the cap plate and supporting the terminal portion with respect to the cap plate; and
a bus bar coupling the terminal portions of the battery units of the plurality of battery units to neighboring battery units of the plurality of battery units,
wherein the support member of each of the battery units comprises:
a lower support portion supported by the upper surface of the cap plate;
an upper support portion comprising a rib extending upwardly from the lower support portion and supporting a lower surface of the terminal portion; and
a first position restriction portion extending above an upper surface of the rib of the upper support portion,
wherein the terminal portion of each of the battery units comprises a leading edge surface supporting a respective one of the first position restriction portions.

12. The battery module of claim 11, wherein each of the battery units further comprises:
a first coupling portion at the support member; and
a second coupling portion at the cap plate, and having a shape that is complementary to a shape of the first coupling portion.

13. The battery module of claim 12, wherein the first coupling portion is on the lower support portion.

14. The battery module of claim 13, wherein the first coupling portion of each of the battery units comprises a protrusion protruding from the lower support portion, or a defines a groove in the lower support portion.

15. The battery module of claim 11, wherein the upper support portion of each of the battery units comprises a closed shape, and
wherein the upper support portion and the lower support portion define a recessed portion that is recessed from the upper support portion toward the lower support portion.

16. The battery module of claim 11, wherein the upper support portion of each of the battery units extends upwardly from an edge of the lower support portion, and wherein the upper support portion defines one or more slot portions.

* * * * *